April 19, 1932.  R. CONRADER  1,855,044
METERING DEVICE
Filed July 20, 1925
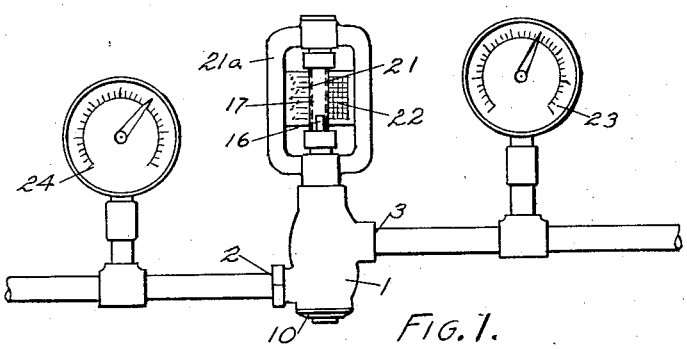
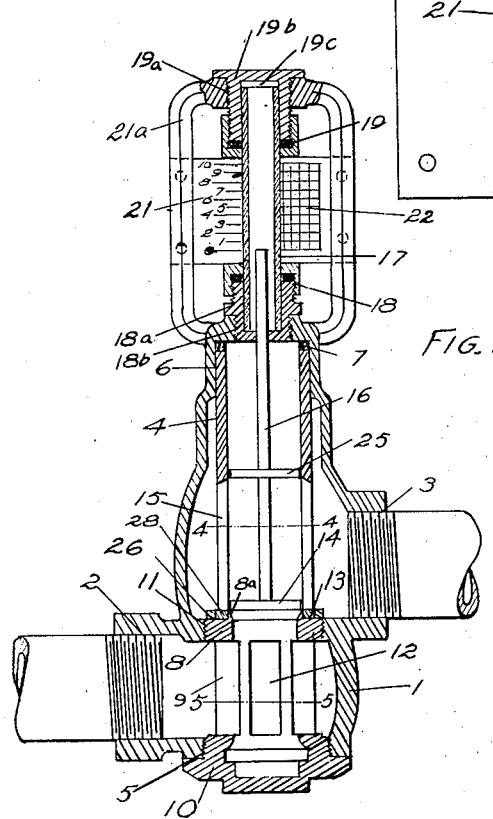
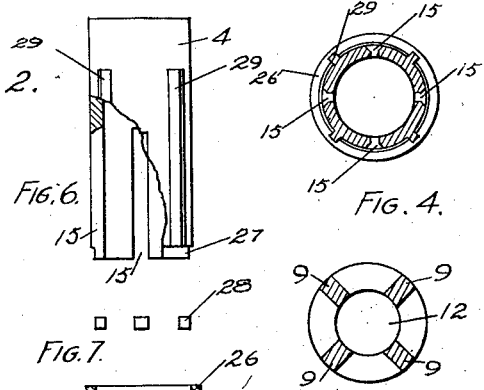
Inventor
Rudolph Conrader
By
Attorney Patented Apr. 19, 1932

1,855,044

UNITED STATES PATENT OFFICE

RUDOLPH CONRADER, OF ERIE, PENNSYLVANIA; SOPHIA CONRADER AND ANNA LAURA CONRADER SEITZ, EXECUTRICES OF SAID RUDOLPH CONRADER, DECEASED, ASSIGNORS TO SOPHIA CONRADER

METERING DEVICE

Application filed July 20, 1925. Serial No. 44,939.

This invention is designed to provide a ready indicator for the flow of fluids particularly in such relations as with pneumatic tools. Such devices at frequent intervals become so deranged as to draw excessive amounts of fluid, or do not properly operate and this device is designed to readily indicate such failure. The device, however, is useful wherever it is desired to read the flow of fluids. Features and details of the invention will appear from the specification and claims.

The invention is illustrated in the accompanying drawings as follows:—

Fig. 1 shows a side elevation of the assembled device.

Fig. 2 shows a central section through the metering device.

Fig. 3 shows an enlarged view of the scale.

Fig. 4 shows a section on the line 4—4 in Fig. 2.

Fig. 5 shows a section on the line 5—5 in Fig. 2.

Fig. 6 shows a detached view partly broken away of the body of the metering cylinder.

Fig. 7 shows fillers at the bottoms of the slits of the metering cylinder.

Fig. 8 shows the ring closing the bottom of the metering cylinder.

1 marks the body of the metering device, 2 the inlet and 3 the discharge from the metering device.

A metering cylinder 4 is placed in the body through an opening 5 at the bottom of the body, the upper end of the cylinder fitting into a cylindrical part 6 in the upper end of the body and seating against a gasket 7. The lower end of the cylinder is seated on a ring 8. Bars 9 connect the ring 8 with a cap 10 closing the opening 5. The ring 8 is secured in a screw-threaded opening 11 in the body and separates the discharge and inlet portions of the body. The bars 9 afford a passage for the fluid to an interior opening 12 which communicates with the lower end of the cylinder. The upper end of the ring 8 has a shoulder 13 which centers the lower end of the cylinder on the ring and forms a seat for the metering piston 14. It will be noted that the cylinder 4 is assembled from the bottom through the openings 5 and 11 and by unscrewing the cap 10 the metering cylinder and parts may be removed for cleaning. This also simplifies the original assembling of the device.

The metering cylinder has the radially directed slits 15 which are axially continuously extended throughout the length that they are opened and closed by the piston. The metering piston rests at the bottom of the cylinder when there is no flow, the bottom seating on a tapered surface 8a. The cylindrical edge of the metering piston 14 forms a square corner with its under surface and this forms a line contact with the seat 8a and as a result of this the entire area of the piston is subjected to the pressure below it in its initial position.

As the liquid flow enters the inlet and reaches the metering piston the plunger piston is lifted to correspond to the flow of the fluid through the slits 15 thus accurately metering the flow through the device, the weight of the piston and connecting parts making a constant differential which can be readily allowed for.

A stem 16 extends upwardly from the piston into a glass 17. The glass is mounted in stuffing boxes 18 and 19 at the top and bottom so that there is no necessity for a close fit around the stem 16 where it passes through the body. The stuffing box 18 is mounted on a fitting 18a screwed into an opening 18b in the upper end of the body and the upper stuffing box is carried by a frame 21a formed integrally with the body and having a screw-threaded opening 19a at its top in which a fitting 19b is screwed having a socket 19c into which the glass extends. The outer edge of this fitting is screw-threaded to secure it through the opening 19a and forms a screw also for the stuffing box.

A scale 21 is mounted on the frame 21a carried by the body and is directly behind the glass 17. This scale has a series of numerals indicating volume at a unit pressure, ordinarily a scale indicating volume at atmospheric pressure. Opposite the scale 21 on the same plate is arranged a computing scale 22. This has the columns a, b, c, d, and e which are arranged to compute the quantity of fluid passing through the metering device at the various pressures indicated at the tops of the columns. The total quantity passing will be indicated by the quantity reading opposite the stem as it corresponds to the flow and in the column corresponding to the pressure to which the fluid is subjected. Thus if the stem were at the reading 6 giving a column of cubic feet and there was a pressure of 80 pounds the total quantity passing would be 32.64 feet.

I prefer to provide the pressure gauges 23 and 24 at the discharge and inlet sides of the metering device, these gauges indicating the differential which occurs at the two sides of the device and thus immediately indicating any derangement of disturbance in the action of the metering device. This is particularly desirable in that the response of the piston must be very sensitive and any sediment or obstruction disturbs this movement. I prefer to provide a dash pot at the upper end of the cylinder. I, therefore, extend the cylinder 4 above the upper end of the slits and secure a piston 25 on the stem 16, the piston having sufficient clearance with relation to the walls to permit of the liquid transfer necessary to give the dash pot action.

In forming the cylinder 4 I prefer to have the slits 15 extend entirely through the bottom of the cylinder and reenforce the bottom of the cylinder by a ring 26 which extends over a reduced portion 27 on the bottom of the cylinder. In order to prevent the springing of the cylinder in the securing of the ring I arrange the blocks 28 in the bottom ends of the slits 15 and further provide the cylinder with ribs 29 on its outer periphery between the slits to stiffen the cylinder. In Figs. 7 and 8 the cylinder and blocks and ring are shown separately before assembly.

What I claim as new is:—

1. In a metering device, the combination of a metering cylinder having radially directed and axially continuously extending metering slits in the lower portion of the cylinder wall; a metering piston in the cylinder adapted to traverse the portions of the cylinder having the slits; means for delivering fluid to the cylinder below the piston; a chamber receiving the discharge from the slits; and a dash pot piston in the upper portion of the cylinder above the slits and connected with the metering piston.

2. In a metering device, the combination of a metering cylinder having slits extending upwardly from its lower end; a ring extending around the cylinder at its lower end; a metering piston arranged in the cylinder; and means for delivering fluid to the lower end of the cylinder and receiving the discharge from the slits.

3. In a metering device, the combination of a metering cylinder having slits extending upwardly from its lower end; a ring extending around the cylinder at its lower end; filling blocks within the ring in the lower ends of the slits; a metering piston arranged in the cylinder; and means for delivering fluid to the lower end of the cylinder and receiving the discharge from the slits.

4. In a metering device, the combination of a metering cylinder having slits extending upwardly from its lower end; ribs arranged on the cylinder between the slits stiffening the cylinder between the slits; a ring extending around the cylinder at its lower ends; filling blocks within the ring in the lower ends of the slits; a metering piston arranged in the cylinder; and means for delivering fluid to the lower end of the cylinder and receiving the discharge from the slits.

5. In a metering device, the combination of a body having a metering cylinder socket at its upper end, an opening through its lower end through which the metering cylinder may be introduced, and lateral inlet and discharge openings, one above the other with a separating wall between, said wall having an opening therethrough; a metering cylinder having its upper end seating in the socket; and a follower extending through the opening in the bottom and the separating wall and forming a seat for the lower end of the metering cylinder.

6. In a metering device, the combination of a body having an opening through the bottom and a cylinder receiving socket at the top; a partition dividing the body into an inlet chamber and a discharge chamber, the body having a lateral inlet opening leading to the inlet chamber and a lateral discharge opening leading from the discharge chamber, one opening being above the other and a metering cylinder in the body seating in the socket and removable through the opening in the bottom; and means comprising a plug closing the opening in the bottom and a member clamping the metering cylinder in place, said member having a passage for fluids in connection with the metering cylinder.

7. In a metering device, the combination of a metering cylinder; a metering piston in the cylinder; a member moving with the piston; and a computing scale adjacent said member and having vertical columns side by side, said columns being designated as indicating varying pressures, said columns having computations arranged in horizontal lines, said scale being traversed vertically by the member moving with the piston whereby the amount indicated on the scale horizontally opposite the member and vertically below the pressure indication of the pressure of the fluid being measured shows the flow volume.

In testimony whereof I have hereunto set my hand.

RUDOLPH CONRADER.